(12) United States Patent
Kim et al.

(10) Patent No.: US 9,156,741 B2
(45) Date of Patent: Oct. 13, 2015

(54) CARBON FIBER-REINFORCED SILICON CARBIDE COMPOSITE MATERIAL AND METHOD OF PREPARING THE SAME

(71) Applicant: KOREA INSTITUTE OF ENERGY RESEARCH, Daejeon (KR)

(72) Inventors: Se-Young Kim, Daejeon (KR); Nam-Jo Jeong, Daejeon (KR); In-Sub Han, Chungcheongnam-do (KR); Sang-Kuk Woo, Daejeon (KR); Doo-Won Seo, Daejeon (KR); Kang Bai, Daejeon (KR); Ji-Haeng Yu, Daejeon (KR); Sun-Dong Kim, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 13 days.

(21) Appl. No.: 14/045,723

(22) Filed: Oct. 3, 2013

(65) Prior Publication Data
US 2014/0100104 A1    Apr. 10, 2014

(30) Foreign Application Priority Data
Oct. 9, 2012    (KR) .................. 10-2012-0111638

(51) Int. Cl.
*C04B 35/653* (2006.01)
*C04B 35/565* (2006.01)
(Continued)

(52) U.S. Cl.
CPC ............. *C04B 35/653* (2013.01); *B01J 21/185* (2013.01); *B01J 23/72* (2013.01); *B01J 23/755* (2013.01); *B01J 27/224* (2013.01); *B01J 35/06* (2013.01); *B01J 37/0081* (2013.01); *B01J 37/08* (2013.01); *B01J 37/084* (2013.01); *B82Y 30/00* (2013.01); *B82Y 40/00* (2013.01); *C01B 31/0226* (2013.01); *C01B 31/36* (2013.01); *C04B 35/565* (2013.01); *C04B 35/573* (2013.01); *C04B 35/806* (2013.01); *B01J 37/0203* (2013.01); *B01J 37/0207* (2013.01); *C04B 2235/405* (2013.01);
(Continued)

(58) Field of Classification Search
CPC ............................ C04B 35/565; C04B 35/573
See application file for complete search history.

(56) References Cited

U.S. PATENT DOCUMENTS

| 6,261,981 B1 * | 7/2001 | Dietrich et al. ............. 501/95.2 |
| 2004/0097360 A1 * | 5/2004 | Benitsch et al. ................ 501/99 |

(Continued)

FOREIGN PATENT DOCUMENTS

| EP | 2543650 A1 | 1/2013 |
| KR | 10-0689636 B1 | 3/2007 |

OTHER PUBLICATIONS

Gu, et. al., Aligned carbon nanotube-reinforced silicon carbide composites produced by chemical vapor infiltration, Carbon, 49 (2011), pp. 2475-2482.*

(Continued)

*Primary Examiner* — Joseph S Del Sole
*Assistant Examiner* — Russell Kemmerle, III
(74) *Attorney, Agent, or Firm* — Enshan Hong; VLP Law Group LLP (57) ABSTRACT

The present invention provides a method of preparing a carbon fiber-reinforced silicon carbide composite material, wherein carbon nanotubes are formed in the composite material, and then metal silicon is melted and infiltrated into the composite material, so the amount of unreacted metal is reduced and the strength of the composite material is improved, and provides a carbon fiber-reinforced silicon carbide composite material prepared by the method.

2 Claims, 5 Drawing Sheets

(51) Int. Cl.

| | |
|---|---|
| *C01B 31/02* | (2006.01) |
| *C04B 35/573* | (2006.01) |
| *C01B 31/36* | (2006.01) |
| *B82Y 30/00* | (2011.01) |
| *B82Y 40/00* | (2011.01) |
| *B01J 37/08* | (2006.01) |
| *B01J 21/18* | (2006.01) |
| *B01J 23/72* | (2006.01) |
| *B01J 23/755* | (2006.01) |
| *B01J 27/224* | (2006.01) |
| *B01J 35/06* | (2006.01) |
| *B01J 37/00* | (2006.01) |
| *C04B 35/80* | (2006.01) |
| *B01J 37/02* | (2006.01) |

(52) U.S. Cl.
CPC ....... *C04B 2235/428* (2013.01); *C04B 2235/48* (2013.01); *C04B 2235/5248* (2013.01); *C04B 2235/616* (2013.01); *C04B 2235/96* (2013.01)

(56) References Cited

U.S. PATENT DOCUMENTS

2006/0062985 A1* 3/2006 Karandikar ................ 428/292.1
2011/0124483 A1* 5/2011 Shah et al. ...................... 501/32

OTHER PUBLICATIONS

De Riccardis (De Riccardis, et. al., Anchorage of carbon nanotubes grown on carbon fibres, Carbon, 44 (2006), pp. 671-674.*

Zhanjun Gu et al., "Aligned carbon nanotube-reinforced silicon carbide composites produced by chemical vapor infiltration," Carbon, vol. 49 (2011), pp. 2475-2482.

Erik T Thostenson et al., "Fabrication and characterization of reaction bonded silicon carbide/carbon nanotube composites," Journal of Physics D: Applied Physics, vol. 38 (2005), pp. 3962-3965.

Hai-Zhe Wang et al., "Fabrication of multi-walled carbon nanotube-reinforced carbon fiber/silicon carbide composites by polymer infiltration and pyrolysis process," Composites Science and Technology, vol. 72 (2011), pp. 461-466.

Search Report dated Dec. 11, 2013 in European Counterpart Patent Appl'n No. 13187476.0.

* cited by examiner

CARBON FIBER-REINFORCED SILICON CARBIDE COMPOSITE MATERIAL AND METHOD OF PREPARING THE SAME

CROSS REFERENCE TO RELATED APPLICATION(S)

This application claims the benefit of Korean Patent Application No. KR 10-2012-0111638, filed on Oct. 9, 2012, which is hereby incorporated by reference in its entirety into this application.

BACKGROUND OF THE INVENTION

1. Technical Field

The present invention relates to a carbon fiber-reinforced silicon carbide composite material and a method of preparing the same.

2. Description of the Related Art

A melt infiltration (MI) process is one of several methods of preparing a fiber-reinforced silicon carbide composite material, and is characterized in that a product can be very easily produced because of short process time and low production cost.

Generally, a melt infiltration (MI) process includes the steps of: 1) impregnating a fiber with a polymer to form a fiber-reinforced plastic and then curing the fiber-reinforced plastic; 2) carbonizing the cured fiber-reinforced plastic under an inert atmosphere; and 3) melting metal silicon and then infiltrating the molten metal silicon into the carbonized fiber-reinforced plastic to prepare a fiber-reinforced silicon carbide composite material.

In this case, the carbonized fiber-reinforced plastic is a porous fiber-carbon composite material, and the molten metal silicon is infiltrated into the carbonized fiber-reinforced plastic through pores by capillary force. However, when the size of pores of the carbonized fiber-reinforced plastic is large, a free metal, which cannot participate in a reaction, exists between the infiltrated molten metal silicon and the carbon contained therein, and an unreacted metal region (metal river or metal pool) is formed.

Due to such an unreacted metal region, the prepared fiber-reinforced silicon carbide composite material exhibits low strength, and particularly, the strength thereof is rapidly lowered at high temperature, thus deteriorating the high-temperature characteristics thereof.

Meanwhile, Korean Patent Registration No. 10-0689636 discloses a method of preparing a carbon fiber-reinforced silicon carbide composite by uniformly applying thermosetting resin powder and ceramic powder onto a carbon fiber and then performing a metal silicon melt-infiltration process. However, this method is problematic in that a free metal, which cannot participate in a reaction, exists between the infiltrated molten metal silicon and the carbon contained therein, thus deteriorating the strength of the carbon fiber-reinforced silicon carbide composite.

SUMMARY OF THE INVENTION

Accordingly, the present invention has been devised to solve the above-mentioned problems, and an object of the present invention is to provide a method of preparing a carbon fiber-reinforced silicon carbide composite material using a melt-infiltration process, by which an unreacted metal region (metal river or metal pool) is not formed in the composite material and the characteristics such as bending strength and the like of the composite material are improved, and provides a carbon fiber-reinforced silicon carbide composite material prepared by the method.

In order to accomplish the above object, an aspect of the present invention provides a method of preparing a carbon fiber-reinforced silicon carbide composite material, including the steps of: mixing a polymer resin with a carbon nanotube forming catalyst; impregnating a carbon fiber with the mixture of the polymer resin and the carbon nanotube forming catalyst and then curing the impregnated carbon fiber to prepare a carbon fiber-reinforced polymer composite material; carbonizing the carbon fiber-reinforced polymer composite material to prepare a carbon fiber-reinforced carbon composite material; and melting metal silicon and then infiltrating the molten metal silicon into the carbon fiber-reinforced carbon composite material.

Another aspect of the present invention provides a method of preparing a carbon fiber-reinforced silicon carbide composite material, including the steps of: impregnating a carbon fiber with a polymer resin to prepare a carbon fiber-reinforced polymer composite material; carbonizing the carbon fiber-reinforced polymer composite material to prepare a carbon fiber-reinforced carbon composite material; dispersing a carbon nanotube forming catalyst in the carbon fiber-reinforced carbon composite material; forming carbon nanotubes in the carbon fiber-reinforced carbon composite material using a gas phase reaction; and melting metal silicon and then infiltrating the molten metal silicon into the carbon nanotube-containing carbon fiber-reinforced carbon composite material.

Still another aspect of the present invention provides a carbon fiber-reinforced silicon carbide composite material prepared by the method.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, the present invention will be described in detail.

The present invention provides a method of preparing a carbon fiber-reinforced silicon carbide composite material, including the steps of: 1) mixing a polymer resin with a carbon nanotube forming catalyst; 2) impregnating a carbon fiber with the mixture of the polymer resin and the carbon nanotube forming catalyst and then curing the impregnated carbon fiber to prepare a carbon fiber-reinforced polymer composite material; 3) carbonizing the carbon fiber-reinforced polymer composite material to prepare a carbon fiber-reinforced carbon composite material; and 4) melting metal silicon and then infiltrating the molten metal silicon into the carbon fiber-reinforced carbon composite material.

Specifically, first, a polymer resin is mixed with a carbon nanotube forming catalyst. The polymer resin may be at least one selected from the group consisting of phenolic resins and pitches. Preferably, the polymer resin may be a phenolic resin. The carbon nanotube forming catalyst may be at least one selected from the group consisting of nickel, copper, aluminum and alloys thereof Subsequently, a carbon fiber is impregnated with the mixture of the polymer resin and the carbon nanotube forming catalyst, and is then cured to prepare a carbon fiber-reinforced polymer composite material.

Subsequently, the carbon fiber-reinforced polymer composite material is carbonized such that a fiber is preserved by heat-treating it under an inert atmosphere and only a carbon component remains by removing organic matter from the cured polymer. In this case, when a carbon source generated during the carbonization of the carbon fiber-reinforced polymer composite material reacts with a catalyst, carbon nanotubes are grown, and thus a carbon fiber-reinforced carbon composite material including carbon nanotubes can be prepared. In this case, when carbon nanotubes are further grown, they can be formed into carbon nanofibers, and thus a carbon fiber-reinforced carbon composite material including both carbon nanotubes and carbon nanofibers can be prepared. The step of carbonizing the carbon fiber-reinforced polymer composite material may be conducted at 600 to 2200° C. under a nitrogen atmosphere or a vacuum atmosphere ($10^{-2}$ torr or more). Meanwhile, when a carbon source is additionally introduced and then reacted with a carbon nanotube forming catalyst, carbon nanotubes can also be grown.

Subsequently, metal silicon is melted and infiltrated into the carbon fiber-reinforced carbon composite material. Preferably, metal silicon may be melted and infiltrated into the carbon fiber-reinforced carbon composite material by depositing metal silicon in or on the carbon fiber-reinforced carbon composite material and then heat-treating the metal silicon at 1500 to 1700° C. under a vacuum atmosphere ($10^{-1}$ torr or more), but the present invention is not limited thereto. When the heat treatment of metal silicon is conducted in the above temperature range of 1500 to 1700° C., the metal silicon is melted without being volatilized, and thus the molten metal silicon can be easily infiltrated into the carbon fiber-reinforced carbon composite material.

Further, the present invention provides a method of preparing a carbon fiber-reinforced silicon carbide composite material, including the steps of: 1) impregnating a carbon fiber with a polymer resin to prepare a carbon fiber-reinforced polymer composite material; 2) carbonizing the carbon fiber-reinforced polymer composite material to prepare a carbon fiber-reinforced carbon composite material; 3) dispersing a carbon nanotube forming catalyst in the carbon fiber-reinforced carbon composite material; 4) forming carbon nanotubes in the carbon fiber-reinforced carbon composite material using a gas phase reaction; and 5) melting metal silicon and then infiltrating the molten metal silicon into the carbon nanotube-containing carbon fiber-reinforced carbon composite material. That is, this method includes the step of carbonizing a carbon fiber-reinforced polymer composite material and then dispersing a carbon nanotube forming catalyst in the carbonized fiber-reinforced polymer composite material.

Specifically, first, a carbon fiber is impregnated with a polymer resin, and is then cured to prepare a carbon fiber-reinforced polymer composite material. The polymer resin may be at least one selected from the group consisting of phenolic resins and pitches. Preferably, the polymer resin may be a phenolic resin.

Subsequently, the carbon fiber-reinforced polymer composite material is carbonized such that a fiber is preserved by heat-treating it under an inert atmosphere and only a carbon component remains by removing organic matter from the cured polymer, thereby preparing a carbon fiber-reinforced carbon composite material. In this case, the step of carbonizing the carbon fiber-reinforced polymer composite material may be conducted at 600 to 2200° C. under a nitrogen atmosphere or a vacuum atmosphere ($10^{-2}$ torr or more).

Subsequently, a carbon nanotube forming catalyst is dispersed in the carbon fiber-reinforced carbon composite material. The carbon nanotube forming catalyst may be at least one selected from the group consisting of nickel, copper, aluminum and alloys thereof. Specifically, a carbon nanotube forming catalyst is dispersed in a solvent, and then the carbon nanotube forming catalyst dispersed in the solvent is injected into the carbon fiber-reinforced carbon composite material in a liquid phase. However, the present invention is not limited thereto.

Subsequently, carbon nanotubes are formed in the carbon fiber-reinforced carbon composite material by a gas phase reaction. In this case, when carbon nanotubes are further grown, they can be formed into carbon nanofibers, and thus the carbon fiber-reinforced carbon composite material can include both carbon nanotubes and carbon nanofibers.

In this case, the reaction gas used in the gas phase reaction may be a liquid or gaseous material containing carbon. Preferably, carbon nanotubes may be grown by introducing $C_2H_2$ gas at 750° C.

Subsequently, metal silicon is melted and infiltrated into the carbon nanotube-containing carbon fiber-reinforced carbon composite material. Preferably, metal silicon may be melted and infiltrated into the carbon nanotube-containing carbon fiber-reinforced carbon composite material by depositing metal silicon in or on the carbon fiber-reinforced carbon composite material and then heat-treating the metal silicon at 1500 to 1700° C. under a vacuum atmosphere ($10^{-1}$ torr or more), but the present invention is not limited thereto. When the heat treatment of metal silicon is conducted in the above temperature range of 1500 to 1700° C., the metal silicon is melted without being volatilized, and thus the molten metal silicon can be easily infiltrated into the carbon nanotube-containing carbon fiber-reinforced carbon composite material.

Further, the present invention provides a carbon fiber-reinforced silicon carbide composite material prepared by the method. This carbon fiber-reinforced silicon carbide composite material is advantageous in that carbon nanotubes formed in the pores thereof react with introduced molten metal silicon to form reticular carbide in the pores thereof, so the amount of unreacted metal is reduced, and the unreacted metal portion thereof is reinforced, thereby improving the characteristics, such as strength and the like, thereof Hereinafter, the present invention will be described in detail with reference to the following Examples. However, these Examples are set forth to illustrate the present invention, and the scope of the present invention is not limited thereto.

EXAMPLE 1

A carbon fiber, as a reinforced fiber, was impregnated with a thermosetting phenol resin as a polymer resin, and was then cured to prepare a carbon fiber-reinforced polymer composite material, and then this carbon fiber-reinforced polymer composite material was carbonized at 1000° C. under a vacuum atmosphere to prepare a carbon fiber-reinforced carbon composite material.

Subsequently, the carbon fiber-reinforced carbon composite material was mixed with nickel as a carbon nanotube forming catalyst to disperse nickel in this composite material.

Subsequently, carbon nanotubes were formed in the carbon fiber-reinforced carbon composite material by a gas phase reaction, and then metal silicon was melted and infiltrated into this composite material at 1650° C. under a vacuum atmosphere to prepare a carbon fiber-reinforced silicon carbide composite material.

EXAMPLE 2

A thermosetting phenol resin, as a polymer resin, was mixed with nickel as a carbon nanotube forming catalyst to prepare a catalyst-containing liquid polymer resin.

Subsequently, a carbon fiber, as a reinforced fiber, was impregnated with the catalyst-containing liquid polymer resin, and was then cured to prepare a carbon fiber-reinforced polymer composite material.

Subsequently, the carbon fiber-reinforced polymer composite material was carbonized at 1000° C. under a vacuum atmosphere to prepare a carbon fiber-reinforced carbon composite material containing carbon nanotubes formed in the pores thereof, and then metal silicon was melted and infiltrated into this composite material at 1650° C. under a vacuum atmosphere to prepare a carbon fiber-reinforced silicon carbide composite material.

COMPARATIVE EXAMPLE 1

A carbon fiber was impregnated with a thermosetting phenol resin as a polymer resin, and was then cured to prepare a carbon fiber-reinforced polymer composite material, and then this carbon fiber-reinforced polymer composite material was carbonized at 1000° C. under a vacuum atmosphere to prepare a carbon fiber-reinforced carbon composite material.

Subsequently, metal silicon was melted and infiltrated into this carbon fiber-reinforced carbon composite material at 1650° C. under a vacuum atmosphere to prepare a carbon fiber-reinforced silicon carbide composite material.

TEST EXAMPLE

1. Observation of Surface of Composite Material

Figure 1:
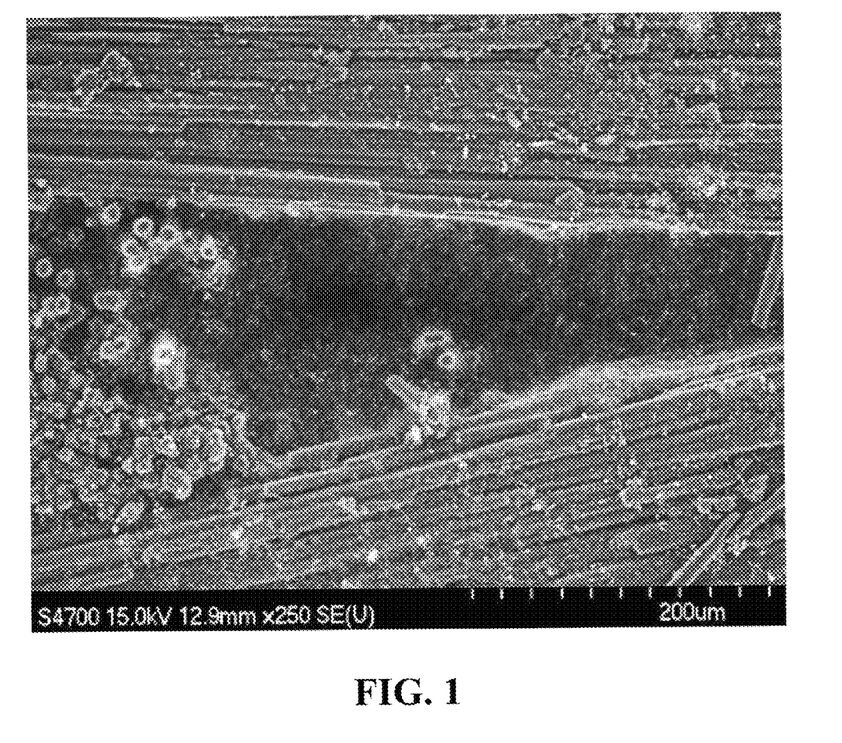
FIG. 1 is a photograph showing the surface of a carbon fiber-reinforced silicon carbide composite material of Example 1.

The surfaces of the carbon fiber-reinforced silicon carbide composite materials prepared in Example 1 and Comparative Example 1 were observed with an electron microscope. The surface of the carbon fiber-reinforced silicon carbide composite material prepared in Example 1 is shown in FIG. 1, and the surface of the carbon fiber-reinforced silicon carbide composite material prepared in Comparative Example 1 is shown in FIGS. 2 and 3.

2. Specimen Fabrication and Bending Strength Evaluation

Figure 4:
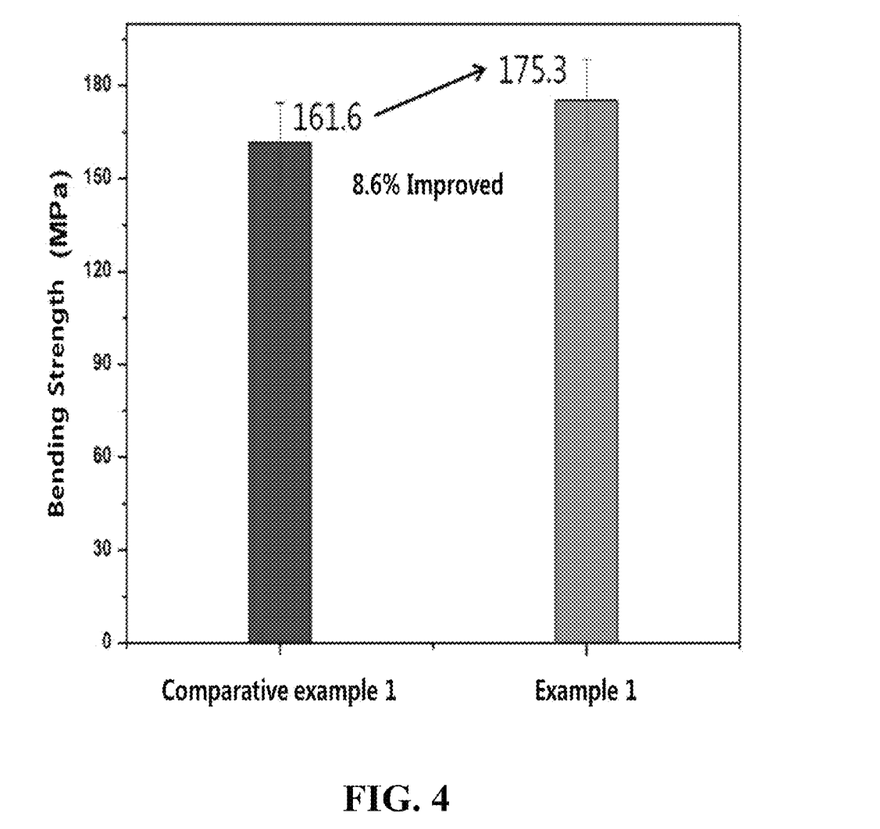
FIG. 4 is a graph showing the result of analysis of bending strengths of the carbon fiber-reinforced silicon carbide composite materials of Example 1 and Comparative Example 1.
Figure 5:
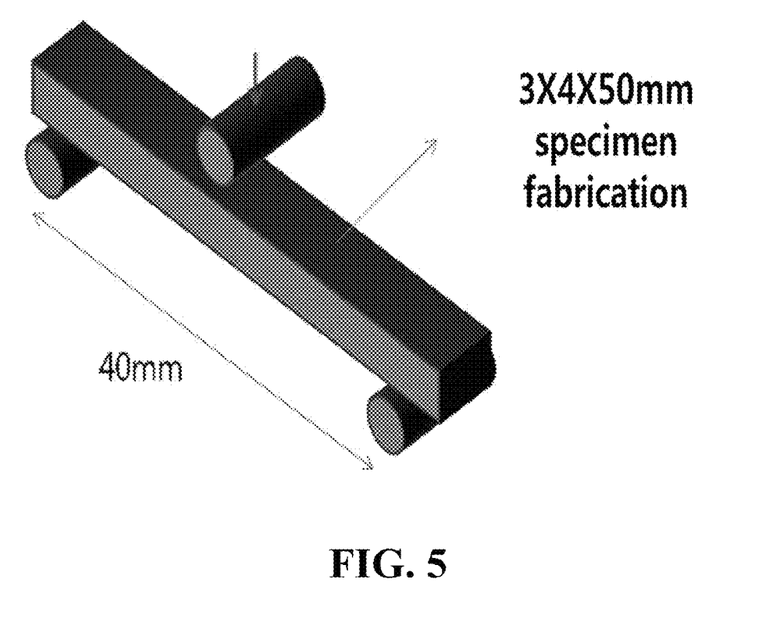
FIG. 5 is a schematic view showing the evaluation of bending strength of a specimen.

As shown in FIG. 5, specimens having a size of 3×4×50 mm were fabricated using the carbon fiber-reinforced silicon carbide composite materials prepared in Examples 1 and 2 and Comparative Example 1, and then the bending strength of each of the specimens was evaluated. The results thereof are shown in FIG. 4.

Figure 2:
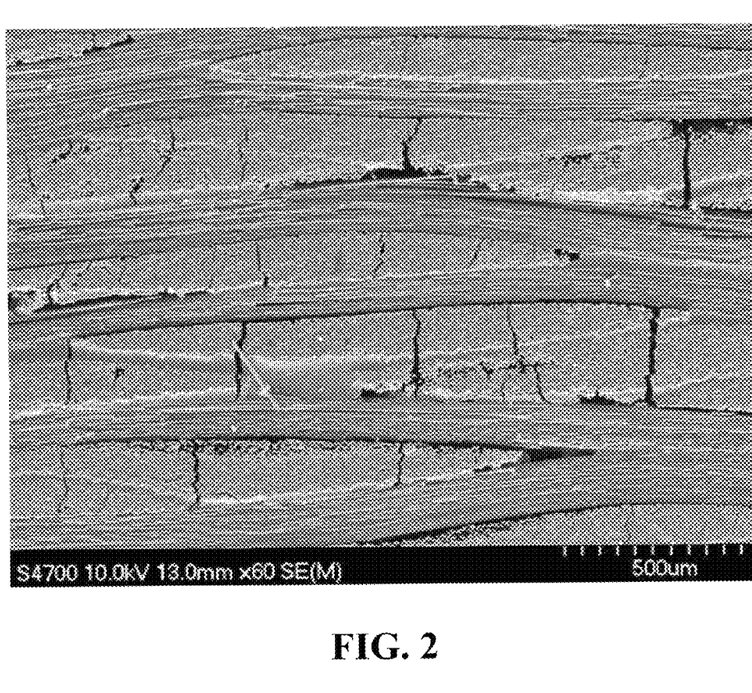
FIG. 2 is a photograph showing the surface of a carbon fiber-reinforced silicon carbide composite material of Comparative Example 1.
Figure 3:
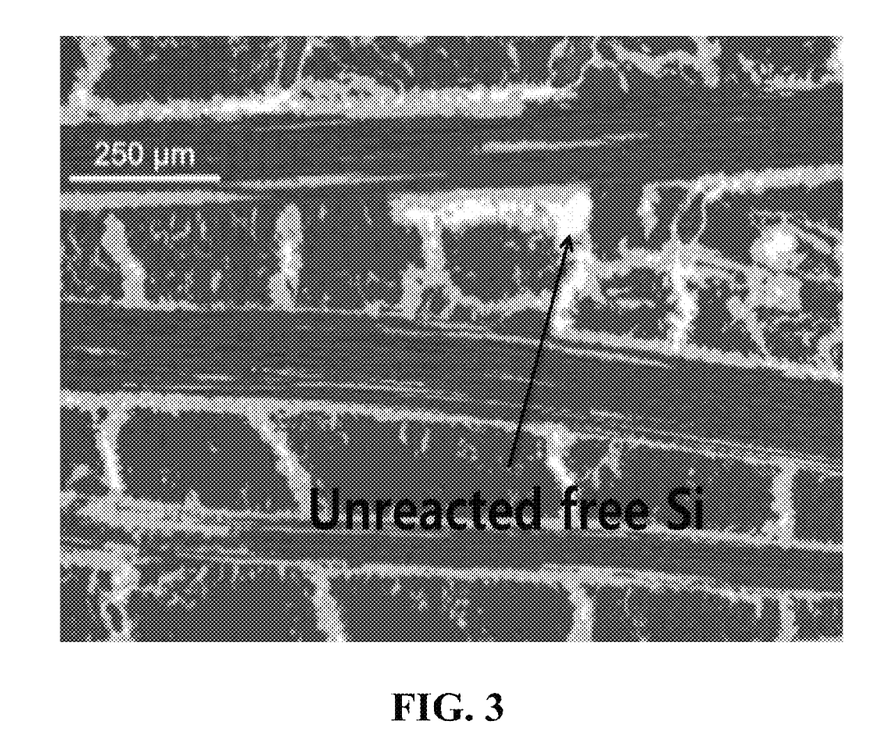
FIG. 3 is a photograph showing the surface of a carbon fiber-reinforced silicon carbide composite material of Comparative Example 1.

In the case of the carbon fiber-reinforced silicon carbide composite material of Comparative Example 1, as shown in FIGS. 2 and 3, it was observed that pores were cracked, and an unreacted metal existed. In contrast, in the case of the carbon fiber-reinforced silicon carbide composite material of Example 1, as shown in FIG. 1, unlike a conventional carbon fiber-reinforced silicon carbide composite material filled with only an unreacted metal, it was observed that a reticular carbide-reinforced region was formed in the pores thereof.

Further, it is shown in FIG. 4 that the bending strength of the specimen fabricated using the carbon fiber-reinforced silicon carbide composite material of Comparative Example 1 is 161.6 MPa, whereas the bending strengths of the specimens fabricated using the carbon fiber-reinforced silicon carbide composite materials of Examples 1 and 2 are 175.3 MPa and 174.8 MPa, respectively.

Consequently, it can be ascertained that the strength of the carbon fiber-reinforced silicon carbide composite material of the present invention is excellent because of carbide formed therein.

As described above, according to the carbon fiber-reinforced silicon carbide composite material of the present invention and the preparation method thereof, carbon nanotubes or carbon nanofibers can be formed in pores of the composite material, the pores thereof being able to be formed therein with an unreacted metal region (metal river or metal pool), thus improving the characteristics, such as bending strength and the like, of the composite material.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of preparing a carbon fiber-reinforced silicon carbide composite material, comprising the steps of A or B:

A 1) mixing a polymer resin with a carbon nanotube forming catalyst;
2) impregnating a carbon fiber with the mixture of the polymer resin and the carbon nanotube forming catalyst and then curing the impregnated carbon fiber to prepare a carbon fiber-reinforced polymer composite material;
3) carbonizing the carbon fiber-reinforced polymer composite material to prepare a carbon fiber-reinforced carbon composite material; and
4) melting metal silicon and then infiltrating the molten metal silicon into the carbon fiber-reinforced carbon composite material;

B 1) impregnating a carbon fiber with a polymer resin to prepare a carbon fiber-reinforced polymer composite material;
2) carbonizing the carbon fiber-reinforced polymer composite material to prepare a carbon fiber-reinforced carbon composite material;
3) dispersing a carbon nanotube forming catalyst in the carbon fiber-reinforced carbon composite material;
4) forming carbon nanotubes in the carbon fiber-reinforced carbon composite material using a gas phase reaction; and
5) melting metal silicon and then infiltrating the molten metal silicon into the carbon nanotube-containing carbon fiber-reinforced carbon composite material, wherein in the above steps, the carbon nanotube forming catalyst is at least one selected from the group consisting of nickel, copper, aluminium and alloys thereof, the step of carbonizing the carbon fiber-reinforced polymer composite material is conducted at 600 to 2200° C.

under a vacuum atmosphere, the step of melting metal silicon and then infiltrating the molten metal silicon into the carbon fiber-reinforced carbon composite material is conducted at 1500 to 1700° C. under a vacuum atmosphere, and reticular carbide is formed in the pores of the carbon fiber-reinforced silicon carbide composite material.

2. The method of claim 1, wherein the polymer resin is at least one selected from the group consisting of phenolic resins and pitches.

* * * * *